United States Patent
Koshinaka

(10) Patent No.: US 8,719,021 B2
(45) Date of Patent: May 6, 2014

(54) SPEECH RECOGNITION DICTIONARY COMPILATION ASSISTING SYSTEM, SPEECH RECOGNITION DICTIONARY COMPILATION ASSISTING METHOD AND SPEECH RECOGNITION DICTIONARY COMPILATION ASSISTING PROGRAM

(75) Inventor: Takafumi Koshinaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1454 days.

(21) Appl. No.: 12/280,594

(22) PCT Filed: Feb. 2, 2007

(86) PCT No.: PCT/JP2007/051778
§ 371 (c)(1),
(2), (4) Date: Aug. 25, 2008

(87) PCT Pub. No.: WO2007/097176
PCT Pub. Date: Aug. 30, 2007

(65) Prior Publication Data
US 2009/0024392 A1   Jan. 22, 2009

(30) Foreign Application Priority Data
Feb. 23, 2006   (JP) .................................. 2006-046812

(51) Int. Cl.
*G10L 15/00* (2013.01)
*G10L 15/06* (2013.01)
*G10L 15/065* (2013.01)
*G10L 15/183* (2013.01)
*G10L 15/22* (2006.01)

(52) U.S. Cl.
CPC ............. *G10L 15/065* (2013.01); *G10L 15/183* (2013.01); *G10L 15/22* (2013.01)
USPC ............ 704/251; 704/257; 704/236; 704/255

(58) Field of Classification Search
CPC ....... G10L 15/183; G10L 15/187; G10L 15/19; G10L 15/193; G10L 15/197
USPC ................. 704/231, 251, 256, 256.1, 256.2
See application file for complete search history.

(56) References Cited

U.S. PATENT DOCUMENTS 5,855,000 A * 12/1998 Waibel et al. ................. 704/235
(Continued)

FOREIGN PATENT DOCUMENTS

JP   2001-92494   4/2001
(Continued)

OTHER PUBLICATIONS

Young, "Acoustic Modelling for Large Vocabulary Continuous Speech Recognition", Proc NATO Advance Study Institute, Springer-Verlag, 1999.*

(Continued)

*Primary Examiner* — Jialong He
(74) *Attorney, Agent, or Firm* — Young & Thompson

(57) ABSTRACT

A speech recognition dictionary compilation assisting system can create and update speech recognition dictionary and language models efficiently so as to reduce speech recognition errors by utilizing text data available at a low cost. The system includes speech recognition dictionary storage section 105, language model storage section 106 and acoustic model storage section 107. A virtual speech recognition processing section 102 processes analyzed text data generated by the text analyzing section 101 by making reference to the recognition dictionary, language models and acoustic models so as to generate virtual text data resulted from speech recognition, and compares the virtual text data resulted from speech recognition with the analyzed text data. The update processing section 103 updates the recognition dictionary and language models so as to reduce different point(s) between both sets of text data.

24 Claims, 7 Drawing Sheets

(56) References Cited

U.S. PATENT DOCUMENTS

| | | | |
|---|---|---|---|
| 5,933,804 A * | 8/1999 | Huang et al. | 704/244 |
| 6,236,965 B1 * | 5/2001 | Kim et al. | 704/254 |
| 6,434,521 B1 * | 8/2002 | Barnard | 704/244 |
| 6,622,121 B1 * | 9/2003 | Crepy et al. | 704/243 |
| 7,266,495 B1 * | 9/2007 | Beaufays et al. | 704/236 |
| 7,505,903 B2 * | 3/2009 | Yamamoto | 704/235 |
| 7,590,536 B2 * | 9/2009 | Bates et al. | 704/244 |
| 7,756,708 B2 * | 7/2010 | Cohen et al. | 704/244 |
| 7,783,474 B2 * | 8/2010 | Cote et al. | 704/9 |
| 2002/0052742 A1 * | 5/2002 | Thrasher et al. | 704/251 |
| 2002/0065653 A1 * | 5/2002 | Kriechbaum et al. | 704/231 |
| 2004/0153312 A1 * | 8/2004 | Yamamoto | 704/10 |
| 2004/0181391 A1 * | 9/2004 | Inoue et al. | 704/10 |
| 2004/0243412 A1 * | 12/2004 | Gupta et al. | 704/254 |
| 2005/0228667 A1 * | 10/2005 | Duan et al. | 704/256 |
| 2006/0085187 A1 * | 4/2006 | Barquilla | 704/243 |

FOREIGN PATENT DOCUMENTS

| | | |
|---|---|---|
| JP | 2002-14693 | 1/2002 |
| JP | 2002-91477 | 3/2002 |
| JP | 2002-229585 | 8/2002 |
| JP | 2003-108180 | 4/2003 |
| JP | 2003-186494 | 7/2003 |
| JP | 2003-316376 | 11/2003 |
| JP | 2004-265440 | 9/2004 |
| JP | 2004-294542 | 10/2004 |
| JP | 2005-99741 | 4/2005 |

OTHER PUBLICATIONS

Office Action issued on Mar. 21, 2012 by the Japanese Patent Office in Japanese Patent Application No. 2008-501662, with English translation of the portions encircled within the wavy line, 3 pages.

* cited by examiner

FIG. 5

| ANALYZED TEXT (PRONUNCIATION) | VIRTUAL TEXT DATA RESULTED FROM SPEECH RECOGNITION (PRONUNCIATION) | FREQUENCY OF OCCURRENCE |
|---|---|---|
| HTML (EICHI-TI-EMU-ERU) | 栄一/低迷 (EIICHI/TEIMEI) | 135 |
| 地上波/デジタル (CHIJOUHA/DEJITARU) | 地上波/デッキ/足る (CHIJOUHA/DEKKI/TARU) | 84 |
| 汚職/事件 (OSHOKU/JIKEN) | 御食事券 (OSHOKUJIKEN) | 41 |
| ⋮ | ⋮ | ⋮ |

US 8,719,021 B2

SPEECH RECOGNITION DICTIONARY COMPILATION ASSISTING SYSTEM, SPEECH RECOGNITION DICTIONARY COMPILATION ASSISTING METHOD AND SPEECH RECOGNITION DICTIONARY COMPILATION ASSISTING PROGRAM

TECHNICAL FIELD

The present invention relates to a speech recognition dictionary compilation assisting system, a speech recognition dictionary compilation assisting method and a speech recognition dictionary compilation assisting program, and particularly relates to a speech recognition dictionary compilation assisting system, a speech recognition dictionary compilation assisting method and a speech recognition dictionary compilation assisting program for creating a speech recognition dictionary that includes vocabulary which is a component of speech recognition process and a language model that formulates the sequence of words according to a rule.

BACKGROUND ART

A speech recognition dictionary compilation assisting system of a related art will be described below. As shown in FIG. 6, the speech recognition dictionary compilation assisting system comprises text analysis means 201, frequency of occurrence counting means 202, updating means 203, background dictionary storing means 204, speech recognition dictionary storing means 205 and language model storing means 206.

The speech recognition dictionary compilation assisting system having such a constitution as described above operates in the following manner.

The text analysis means 201 receives text data, including a vocabulary that is subject to speech recognition, from the outside and processes the text data by applying morphological analysis using a dictionary stored in the background dictionary storing means 204, so as to divide the text data into a sequence of words, give pronunciation character string to it, attach a tag indicating the part of speech as required, and sends the data resulting from these operations to the frequency of occurrence counting means 202. The frequency of occurrence counting means 202 receives the sequence of words from the text analysis means 201, counts the number of times that each word appears and sends the result to the updating means 203. The updating means 203 calculates the probability of each word to appear, from the frequency that the word is used received from the frequency of occurrence counting means 202, compares a calculated probability with a occurrence probability of the word stored in the language model storing means 206, and corrects the occurrence probability stored in the language model storing means 206, so that the stored value of probability becomes proximate to that calculated from the text data. The updating means 203 also checks, for those of the words used in the text data that have occurrence probabilities higher than certain level, to see whether they are already entered in the speech recognition dictionary stored in the speech recognition dictionary storing means 205, so as to regard words that have not been entered in the speech recognition dictionary as unknown words and memorize the words and the occurrence probabilities thereof in the speech recognition dictionary storing means 205 and in the language model storing means 206.

It is a usual practice for the frequency of occurrence counting means 202 to count the frequency that a string of two or three consecutive words appears, in addition to the counting of the frequency of individual words. It is also a usual practice to provide the updating means 203 or the like with an interface used to correct the boundary between words and manually input the pronunciation in such cases as words are divided incorrectly or wrong pronunciation is allocated to a word during the morphological analysis of the text analysis means 201 (refer to Patent Document 1).

Another example of the speech recognition dictionary compilation assisting system of the related art is described in Patent Document 1. FIG. 7 shows one that is modified to allow comparison of the speech recognition dictionary compilation assisting system of Patent Document 1 with FIG. 6. The speech recognition dictionary compilation assisting system comprises character string comparison means 301, unknown word extracting means 302, updating means 303, speech recognition dictionary storing means 305 and language model storing means 306, and is characterized by the use of the result of correcting wrong recognition, rather than detecting unknown words by applying a statistical technique.

The speech recognition dictionary compilation assisting system having such a constitution as described above operates in the following manner.

That is, the character string comparison means 301 receives, from the outside, a speech recognition dictionary stored in the speech recognition dictionary storing means 305, text data resulted from speech recognition obtained through recognition of the speech to be recognized by using the speech recognition means, that is not shown, including a language model stored in the language model storing means 306 as a constituent element, and the text data having the wrong recognition corrected that is obtained by manually correcting the recognition errors included in the text data resulted from speech recognition, and extracts a word or a string of words in such a form that includes the recognition error at each position where difference has occurred, that is at each position where the recognition error has occurred, while sending the result of extraction to the unknown word extracting means 302. The unknown word extracting means 302 checks each of the words or the strings of words received from the character string comparison means 301 to see whether the word or the string of words is included in the speech recognition dictionary stored in the speech recognition dictionary storing means 305 and, if not, enters the word or the string of words as a new word in the speech recognition dictionary storing means 305. The unknown word extracting means also stores the new word and the occurrence probability thereof in the language model storing means 306

Patent Documents 2 to 4 describe other methods for extracting and entering unknown words in the speech recognition dictionary. Patent Document 2 discloses an unknown word entering apparatus that enables it to extract words by applying morphological analysis to a text file which includes unknown word and enter a word not found in the speech recognition dictionary after allocating the pronunciation and part of speech thereto by making reference to a background dictionary. Patent Documents 3 and 4 disclose unknown word entering apparatuses that have functions to conjecture the part of speech and pronunciation of the unknown word and automatically enter the unknown word in the dictionary.

Patent Document 5 discloses a method of counting the frequency of occurrence of words in pages collected from the World Wide Web sites, and updating the order of priority in selecting among words of the same pronunciation entered in the speech recognition dictionary.

Patent Document 6 discloses an acoustic model managing server and a language model managing server that send vocal utterance models (acoustic model and language model) used in collation with input speech data to a speech recognition apparatus, the acoustic model managing server and the language model managing server having a function to periodically update the acoustic model and the language Patent Document 7 is also cited as a background technology of the present invention. While Patent Document 7 relates to a speech recognition apparatus, it also describes a method of generating a phoneme string from an unknown word that is not included in a background dictionary (morphological analysis dictionary).

[Patent Document 1] Japanese Patent Kokai Publication No. JP-P2002-229585A
[Patent Document 2] Japanese Patent Kokai Publication No. JP-P2003-316376A
[Patent Document 3] Japanese Patent Kokai Publication No. JP-P2004-265440A
[Patent Document 4] Japanese Patent Kokai Publication No. JP-P2002-014693A
[Patent Document 5] Japanese Patent Kokai Publication No. JP-P2005-099741A
[Patent Document 6] Japanese Patent Kokai Publication No. JP-P2002-091477A
[Patent Document 7] Japanese Patent Kokai Publication No. JP-P2004-294542A

DISCLOSURE OF THE INVENTION

Problems to be Solved by the Invention

A problem of the former method of detecting unknown words by applying a statistical technique is that it is costly to collect the text data, or it requires high skill to sort out the text data in order to obtain a satisfactory result. Particularly it may not be easy to prepare text data that resembles the speech to be recognized.

The phrase "resembles the speech to be recognized" refers to both the similarity in contents or subject matter and the similarity in the style of speech. For example, in the case of displaying subtitles on a TV news program by means of speech recognition system, it is a common practice to use a newspaper article as the text data for the subtitle. In this case, the speech to be recognized (vocal utterance by a news caster) and the newspaper article coincide in the subject matter, but are different in the style of narrative. That is, the news caster talks in a manner of speaking to the audience, while the newspaper article conveys the information in a written-sentence manner. There is also such a difference that a speech includes fillers such as "er" and "well" frequently. There occurs such a problem that dictionary and language models created by ignoring the difference in such style of speech results in failure to correctly recognize a speech that has a characteristic style proper to speech.

As described above, building an environment that enables it to obtain the result of correct speech recognition requires that text data to be used is carefully sorted out by an experienced person, or that a corpus of speeches (vocal utterances) made by the subject of recognition in the past is precisely put into written sentences by spending significant amounts of time and labor, which inevitably results in increasing operating cost in either way.

Patent Documents 3, 5 and 6 propose to collect text data from the Internet or multimedia broadcast, which naturally involves a deviation from the speech (vocal utterance) of the subject to be recognized, thus restricting the value of the result of recognition.

Second problem with the related art is the fact that recognition error that occurs in a situation involving phonetically resembling words or word strings is not reflected on the dictionary and language models. For example, methods described in Patent Documents 2 to 5 merely take into consideration whether individual words appear in the text data or not, and the number of appearances, and do not pay any consideration to the possible result of performing actual speech recognition process that also involves phonetic information. Whether a particular word should be included in the dictionary or not must be determined by considering whether the word in question phonetically equals or resembles another word included in the dictionary. If there is a resembling word, it is necessary to remove the word from the dictionary or lower the order of priority (probability of occurrence) of the word in the language model. However, there remains a possibility of double entry in the dictionary in the related art.

Third problem with the related art is the fact that it is not easy to formulate such dictionary and language models that are capable of correctly recognizing a composite word formed of a plurality of words connected together. Even in a case where the individual words forming a composite word have already been entered in the dictionary, probability of correctly recognizing the composite word as a whole becomes low if the language model used in the speech recognition gives a lower probability of connection to the words. Moreover, as previously mentioned, it is difficult to collect text data that include a large number of composite words, which causes a problem related to the cost.

Fourth problem with the related art is that it is difficult to correctly feedback a recognition error to the dictionary and language models thereby to prevent recognition errors from occurring, as a result of the problems described above. With this regard, Patent Document 1 discloses that recognition errors can be reliably reflected to the dictionary by using the recognition errors that have actually occurred in speech recognition systems in operation. However, this results in another disadvantage that it is necessary to actually observe recognition errors that occur in the speech recognition systems during operation.

In the method described in Patent Document 1, there remains another problem that it is not possible to exclude recognition errors arising from causes other than the dictionary and language models. Recognition errors that occur in a speech recognition system include those originating from acoustic factors additionally to those caused by the dictionary and language models. For example, there may occur a recognition error caused by analyzing a speech superimposed with loud background noise, a recognition error caused by analyzing a speech transmitted via telephone having a narrow bandwidth that generally makes it difficult to catch the words, a recognition error caused by analyzing a mumbling speech, and so on. For such error-cases as these, it would be difficult to reflect on the dictionary and language models to achieve meaningful correction thereof by the method described in Patent Document 1.

In consideration of the background described above, it is an object of the present invention to provide a speech recognition dictionary compilation assisting system, a speech recognition dictionary compilation assisting method and a speech recognition dictionary compilation assisting program capable of creating dictionary and language models that are optimized so as to be capable of utilizing low-cost text data, taking account of phonetic resemblance between words and efficiently reducing speech recognition errors caused by linguistic factors.

Means to Solve the Problems

According to a first aspect of the present invention, there is provided a speech recognition dictionary compilation assisting system that comprises: a storing section for storing dictionary and language models and an acoustic model; a text analysis section for applying morphological analysis to text data; a virtual speech recognition processing section that applies the dictionary and language models and the acoustic model to the analyzed text data obtained from the text analysis section so as to generate virtual text data resulted from speech recognition, and extracts different point(s) between the analyzed text data and the virtual text data resulted from speech recognition; and an update processing section that corrects at least one of the dictionary and language models; as well as a speech recognition dictionary compilation assisting method that is performed by using the system, and a program for realizing the system.

The speech recognition dictionary compilation assisting system having the constitution described above generates the virtual (predictive or expectable) text data resulted from speech recognition (termed "virtual speech recognition result text data") from given text data, and updates the dictionary and language models by using the result of comparison of the virtual text data resulted from speech recognition and the original text data.

Meritorious Effects of the Invention

The present invention makes it possible to use text data that is available relatively easily for predicting recognition error in speech recognition process in operation and create dictionary and language models that reflect the result of prediction. This is achieved by such a constitution as the dictionary and language models and the acoustic model are used to perform virtual (predicting) speech recognition and the result of virtual speech recognition is used to update the dictionary and language models.

BRIEF DESCRIPTION OF THE DRAWINGS

FIG. 5 is a diagram explanatory of the operation of the speech recognition dictionary compilation assisting system according to the first exemplary embodiment of the present invention.

EXPLANATION OF REFERENCE SIGNS

Figure 1:
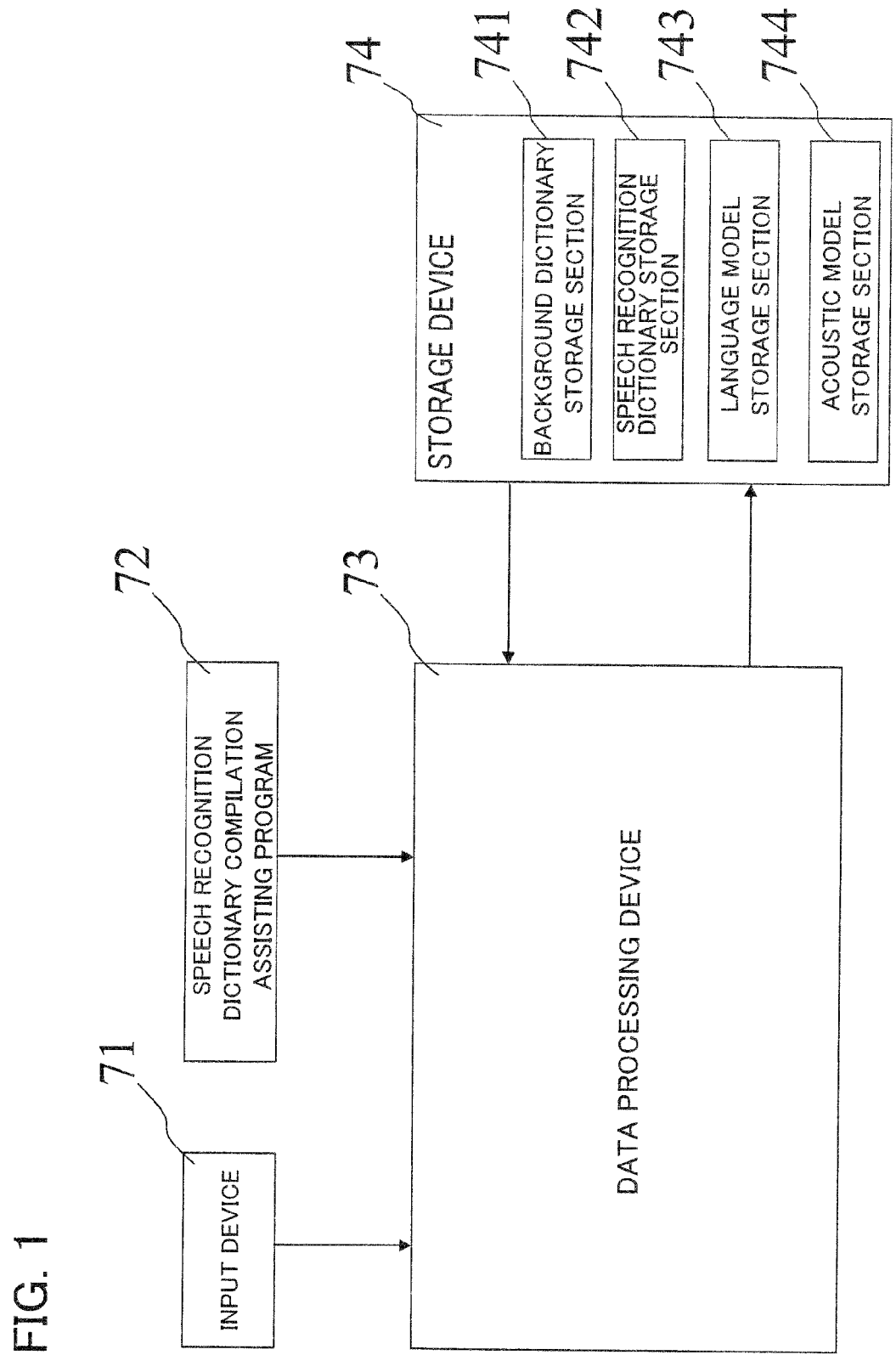
FIG. 1 shows schematic constitution of the speech recognition dictionary compilation assisting system according to a first exemplary embodiment of the present invention.

61 Pronunciation/phoneme string converting section
62 Phoneme/state string converting section
63 State/feature string converting section
64 Optimum word string searching section
65 Text data comparison section
71 Input device
72 Speech recognition dictionary compilation assisting program
73 Data processing device
74 Storage device
101 Text analyzing section
102 Virtual speech recognition processing section
103 Update processing section
104, 741 Background dictionary storage section
105, 742 Speech recognition dictionary storage section
106, 743 Language model storage section
107, 744 Acoustic model storage section
108 Text data
201 Text analyzing means
202 Frequency of occurrence counting means
203 Updating means
204 Background dictionary storing means
205 Speech recognition dictionary storing means
206 Language model storing means
301 Character string comparing means
302 Unknown word extracting means
303 Updating means
305 Speech recognition dictionary storing means
306 Language model storing means

PREFERRED MODES FOR CARRYING OUT THE INVENTION

Preferred mode for carrying out the present invention will be described in detail below with reference to the accompanying drawings. FIG. 1 shows schematic constitution of the speech recognition dictionary compilation assisting system according to the first exemplary embodiment of the present invention. The speech recognition dictionary compilation assisting system shown in FIG. 1 is formed of a data processing apparatus (computer) 73 comprising an input device 71 and a storage device 74.

The storage device 74 is formed of a hard disk or the like that has a background dictionary storage section 741, a speech recognition dictionary storage section 742, a language model storage section 743 and an acoustic model storage section 744 for storing the background dictionary, dictionary and language models and the acoustic model, respectively.

The data processing apparatus (computer) 73 having the formulation described above and a speech recognition dictionary compilation assisting program 72 executed thereby provide various processing means (text analyzing section 101 through updating process section 103 in FIG. 2) to be described later.

Figure 2:
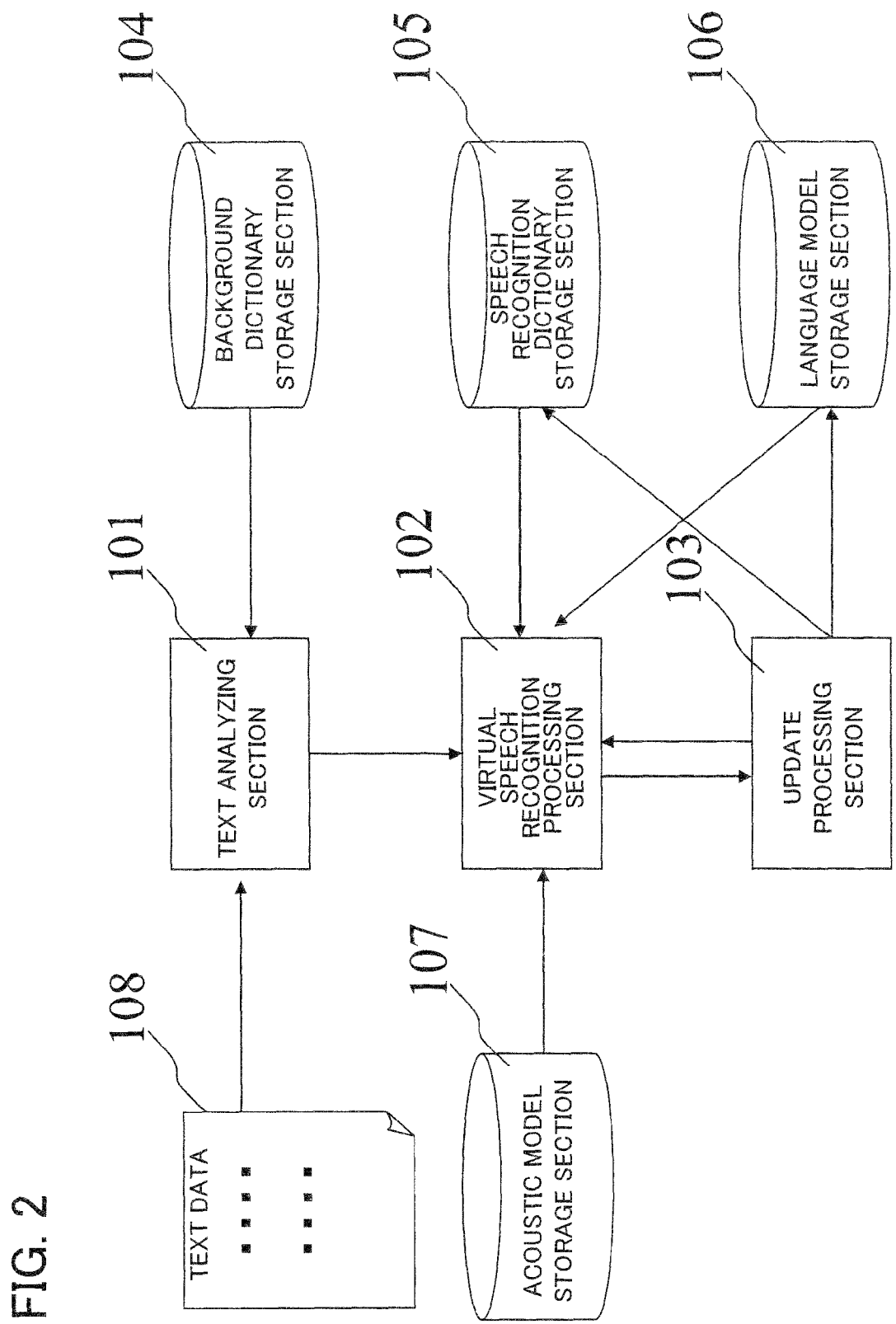
FIG. 2 is a block diagram depicting the speech recognition dictionary compilation assisting system according to the first exemplary embodiment of the present invention in functional blocks.

FIG. 2 is a block diagram depicting the speech recognition dictionary compilation assisting system in functional blocks. The speech recognition dictionary compilation assisting system of this exemplary embodiment shown in FIG. 2 is formed of a text analyzing section 101, a virtual speech recognition processing section 102, an update processing section 103, a background dictionary storage section 104, a speech recognition dictionary storage section 105, a language model storage section 106 and an acoustic model storage section 107.

The text analyzing section 101 divides (resolves) text data 108 (character or letter string) input from the outside into words and assigns each word with part of speech tag and pronunciation. More specifically, the text analyzing section 101 reads the text data 108 and the background dictionary stored in the background dictionary storage section 104, so as to analyze the text data 108 and output analyzed text data.

The virtual speech recognition processing section 102 extracts such words and phrases that have high probabilities of inducing an error in speech recognition because they are not included in the speech recognition dictionary, assigned with low order of priorities in the language model, or other causes. More specifically, the virtual speech recognition processing section 102 reads the dictionary and language models and the acoustic model stored in the speech recognition dictionary storage section 105, the language model storage section 106 and the acoustic model storage section 107, respectively, virtually performs (virtual) recognition process to the analyzed text data received from the text analyzing section 101 to generate virtual text data resulted from speech recognition that corresponds to the analyzed text data, and compares the analyzed text data and the virtual speech recognition result text data thereby to extract and output the different point or points (termed "point(s)").

The update processing section 103 carries out processes such as alteration of the speech recognition dictionary and language models so as to reflect the words and phrases that are determined by the virtual speech recognition processing section 102 to have high probabilities of inducing recognition errors. More specifically, the update processing section 103 corrects the speech recognition dictionary and language models that are stored in the speech recognition dictionary storage section 105 and in the language model storage section 106, in accordance to the different point(s) (difference information) provided by the virtual speech recognition processing section 102.

The background dictionary storage section 104 and the speech recognition dictionary storage section 105 store the background dictionary and the speech recognition dictionary, respectively. The background dictionary is also termed a morphological element analysis dictionary, and holds a vocabulary of a size several tens to several hundreds of times larger than that of the speech recognition dictionary. As a result, the background dictionary is capable of assigning information such as pronunciation to most of the words included in the given text data in many cases. Even when the text data includes an unknown word that is not registered in the background dictionary, pronunciation information can be assigned by using a technology, for example, described in Patent Document 5, etc.

The language model storage section 106 and the acoustic model storage section 107 store the language model and the acoustic model, respectively.

The speech recognition dictionary and language models stored at the start in the speech recognition dictionary storage section 105 and the language model storage section 106, respectively, are similar to those used by the speech recognition system intended to be actually operated. Similarly, the acoustic model stored in the acoustic model storage section 107 is preferably similar in principle to that used by the speech recognition system intended to be actually operated.

Now detailed description will be given for the formulation of the virtual speech recognition processing section 102 that generates the virtual speech recognition result text data (may be termed "virtual text data") from the analyzed text data by using the speech recognition dictionary and language models and the acoustic model described above.

Figure 3:
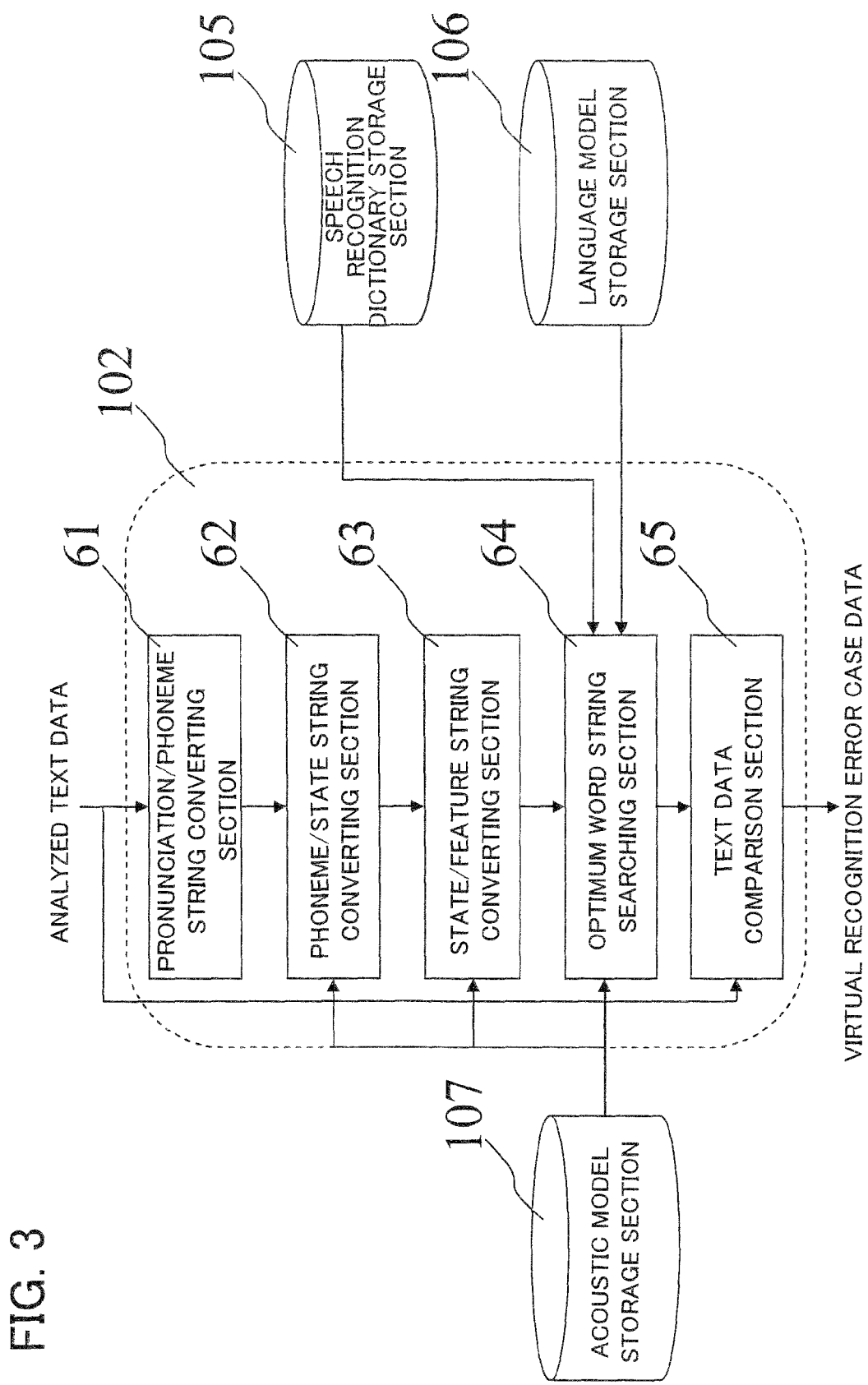
FIG. 3 shows an example of formulation of virtual speech recognition processing section of the speech recognition dictionary compilation assisting system according to the first exemplary embodiment of the present invention.

FIG. 3 shows an example of the formulation of the virtual speech recognition processing section 102. The virtual speech recognition processing section 102 shown in FIG. 3 is formed of a pronunciation/phoneme string converting section 61, a phoneme/state string converting section 62, a state/feature string converting section 63, an optimum word string searching section 64 and a text data comparison section 65.

The pronunciation/phoneme string converting section 61 reads the analyzed text data, where the text is divided (resolved) into individual words and pronunciation is assigned to each word, in suitable units, for example sentence by sentence, transforms a string of phonetic symbols that is typically expressed by HIRAGANA letters or KATAKANA letters into a phoneme string in accordance to a syllable-phoneneme string conversion table, and successively outputs the phoneme strings. The phoneme refers to the unit of speech recognition, and are represented by symbols a, i, u, . . . for vowels and k, s, t, . . . for consonants.

When a string of phonetic symbols OHAYOOGOZAIMASU ("good morning" in Japanese) is given, for example, the pronunciation/phoneme string converting section 61 outputs a phoneme string "/#/o/h/a/y/o/o/g/o/z/a/i/m/a/s/u/#/" (symbol # in this string represents a silent start/termination of pronunciation).

In the case of more commonly used acoustic model based on triphone that parses on the basis of three consecutive phonemes, the pronunciation/phoneme string converting section 61 resolves the string of phonetic symbols OHAYOOGOZAIMASU into a phoneme string "/#/#−o+h/o−h−a/h−a+y/a−y+o/y−o+o/o−o+g/o−g+o/g−o+z/o−z+a/z−a+i/a−i+m/i−m+a/m−a+s/a−s+u/s−u+#/#/".

As most of the speech recognition systems currently in operation use phonemes as the recognition unit, the example of the present invention uses phonemes as the recognition unit. However, the present invention can be implemented in principle by using, for example, syllable or half syllable as the recognition unit, and there is no particular restriction on the choice of recognition unit.

The phoneme/state string converting section 62 processes the phoneme string received from the pronunciation/phoneme string converting section 61 by making reference to the syntactic information of the acoustic model stored in the acoustic model storage section 107, so as to output a state string that is generated by expanding the phonemes into a series of states.

The "state" mentioned above is a concept related to the hidden Markov model (hereinafter abbreviated as HMM) that is commonly used as the acoustic model in speech recognition. In case phonemes are modeled in accordance to HMM, the state is regarded as a more elementary unit that is a subdivision of the phoneme. The acoustic model is constituted as a collection of HMM generated for each phoneme, and the HMM of one phoneme consists of several states. Thus a phoneme can be easily transformed into a state string by making reference to the acoustic model. For example, in the case of an acoustic model that uniformly resolves each phoneme into three states, the phoneme string described above is transformed into: #[1], o[1]. o[2], o[3], h[1], h[2], h[3], a[1], a[2], a[3], y[1], y[2], y[3], o[1], . . . , i[3], m[1], m[2], m[3], a[1], a[2], a[3], s[1], s[2], s[3], u[1], u[2], u[3], #[1]. The numeral in parentheses represents the state number. The same applies also to a case where the acoustic model is constituted from the triphones. It is common to model the silent symbol # as a state 1.

The state/feature string converting section 63 reads the acoustic model stored in the acoustic model storage section 107, successively receives the state strings that are output from the phoneme/state string converting section 62, and outputs a sequence of feature vectors that include acoustic feature parameters used in speech recognition. Namely, the feature vectors are generated based on random numbers in accordance to probability distribution, for example composite Gaussian distribution, that is defined for each state in the acoustic model. The number of feature vectors to be generated for each state is also determined based on random numbers in accordance to the state transition probability that is defined for each state.

The optimum word string searching section 64 reads the speech recognition dictionary, language models and the acoustic model that are stored in the speech recognition dictionary storage section 105, the language model storage section 106 and the acoustic model storage section 107, respectively, successively receives the feature vector strings from the state/feature string converting section 63, and applies a search technique such as frame-synchronized beam search that is widely employed in speech recognition systems, to retrieve a string of words that best matches the feature vector string, namely virtual text data resulted from speech recognition (generally, a sentence constituted from a mixture of Chinese characters and KANA characters), and outputs it.

The text data comparison section 65 compares the virtual text data resulted from speech recognition that is output from the optimum word string searching section 64 and the analyzed text data that is input to the virtual text data resulted from speech recognition 102 in the corresponding portions thereof, so as to extract a pair of character strings in the disagreement portion (different point(s)), namely a pair of virtual correct character string and virtual character string resulted from speech recognition. The text data comparison section 65 then counts the frequency of occurrences for each corresponding character string, and sends the result as virtual recognition error case data illustrated in FIG. 5, as an example, to the update processing section 103.

Figure 4:
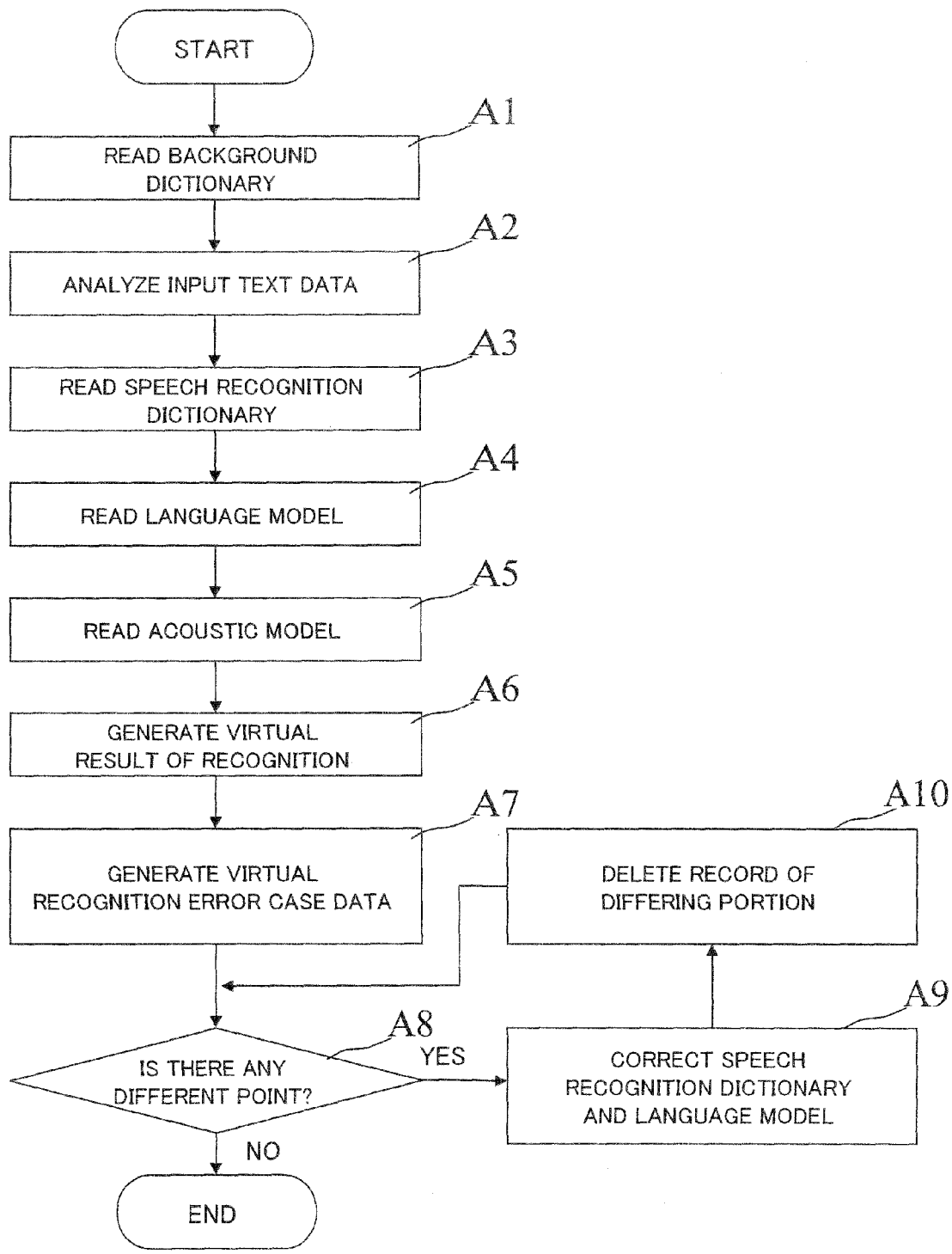
FIG. 4 is a flow chart showing the operation of the speech recognition dictionary compilation assisting system according to the first exemplary embodiment of the present invention.
Figure 6:
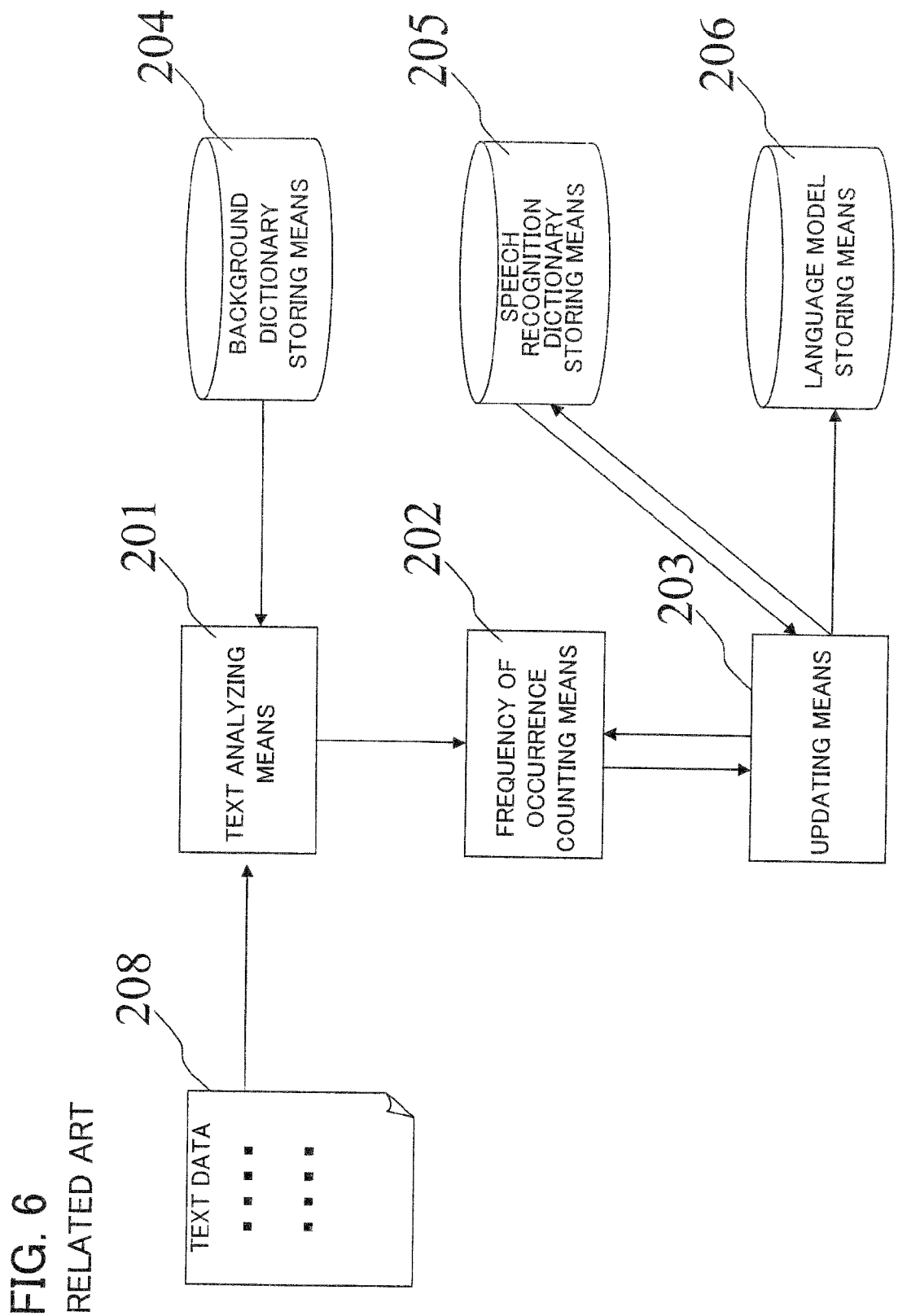
FIG. 6 is a block diagram depicting the speech recognition dictionary compilation assisting system of a related art in functional blocks.
Figure 7:
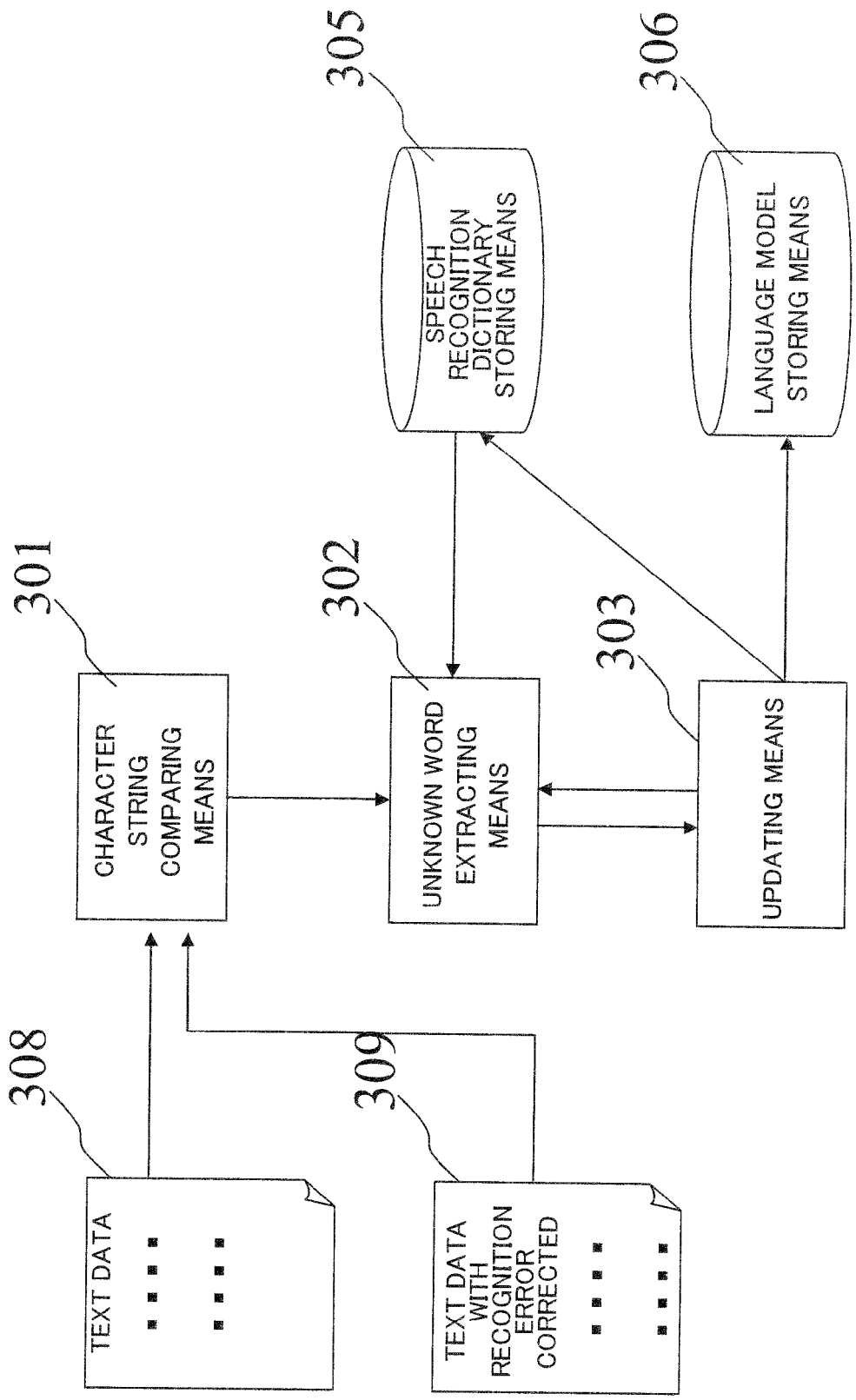
FIG. 7 is a block diagram depicting the speech recognition dictionary compilation assisting system of a related art in functional blocks.

The overall operation of this exemplary embodiment will be described in detail below with reference to the accompanying drawings. FIG. 4 is a flow chart illustrating the operation of the speech recognition dictionary compilation assisting system according to this exemplary embodiment.

As shown in FIG. 4, the text analyzing section 101 reads the background dictionary stored in the background dictionary storage section 104 (step A1) and applies morphological analysis to given text data (step A2). The morphological analysis resolves the text data into words, and assigns each word with part of speech tag and pronunciation (a string of symbols representing the pronunciation of the word) as required.

As mentioned previously, the background dictionary holds a vocabulary of size several tens to several hundreds of times larger than that of the speech recognition dictionary, and is therefore capable of assigning information such as pronunciation to most of the words included in the given text data. Even when the text data includes an unknown word that is not included in the background dictionary, pronunciation can be assigned by using the technology, for example, described in Patent Document 5.

Then the virtual speech recognition processing section 102 reads the recognition dictionary and language models and the acoustic model stored in the speech recognition dictionary storage section 105, the language model storage section 106 and the acoustic model storage section 107, respectively, (steps A3 to A5), applies the virtual speech recognition process to the text that is output from the text analyzing section 101 so as to generate virtual text data resulted from speech recognition (step A6).

The virtual speech recognition processing section 102 then compares the analyzed text data and the corresponding virtual text data resulted from speech recognition, and extracts a word or a word string as virtual recognition error case in the disagreement portion(s) (different point(s)), so as to generate virtual recognition error case data (refer to FIG. 5) (step A7).

When a sequence of words including the word in the disagreement portion has such a form as a plurality of nouns follow one another and can be regarded to constitute a phrase, the words may be extracted in a unit of phrase. For example, if the analyzed text data includes a word string " . . . /CHIJOUHA/DEJITARU/ . . . " and the virtual text data resulted from speech recognition includes in the corresponding portion thereof a string " . . . /CHIJOUHA/DEKKI/TARU/ . . . ", then a pair of DEJITARU and DEKKI/TARU may be extracted at the level of words, or a pair of character strings "CHIJOUHA/DEJITARU" and "CHIJOUHA/DEKKI/TARU" may be extracted at the level of noun phrase, or both of these may be extracted.

Last, the virtual speech recognition processing section 102 sends the pair of character strings on the word level and/or phrase level and the pronunciations thereof along with the respective frequencies of occurrences thereof to the update processing section 103. FIG. 5 shows an example of virtual recognition error case data that is sent by the virtual speech recognition processing section 102 to the update processing section 103.

Upon receiving the virtual recognition error case data that is output from the virtual speech recognition processing section 102, the update processing section 103 picks up pieces of the data one by one and, in accordance to the content thereof, applies modification as described below to the recognition dictionary and language models stored in the speech recognition dictionary storage section 105 and the language model storage section 106 (steps A8 to A10).

Take the case shown in FIG. 5 as an example. If the first entry HTML, EIICHI/TEIMEI is picked up and the word HTML of the analyzed text corresponding to the correct character string in speech recognition is not included in the speech recognition dictionary, the update processing section 103 adds the word HTML to the speech recognition dictionary and sets a default value (a medium degree of priority that is tentatively determined) for the priority of the word HTML in the language model.

In case the word HTML already exists in the speech recognition dictionary, the update processing section 103 does not update the speech recognition dictionary and increases the priority of the word HTML in the speech recognition dictionary by a predetermined value.

For the next entry CHIJOUHA/DEJITARU, CHIJOUHA/DEKKI/TARU, too, if CHIJOUHA/DEJITARU is not included in the speech recognition dictionary, it is added to the speech recognition dictionary and a default value is set for the priority in the language model. If CHIJOUHA/DEJITARU already exists in the speech recognition dictionary, the priority of the word in the language model is increased.

As the process described above is repeated for all entries, the dictionary and language models that are optimized so as to prevent a speech recognition error from occurring are obtained by using low-cost text data that is easily available.

In the exemplary embodiment described above, the dictionary and language models are updated by using all entries of the virtual recognition error case data. However, the process may be modified so that, for example, entries that have extremely low frequencies of occurrence will not be used in updating the recognition dictionary and language models. Alternatively, entries to be reflected on the recognition dictionary and language models may be sorted by using the information on the frequencies of occurrence and the like, and the process may be repeated until a proportion of portions that correspond to recognition errors in the virtual text data resulted from speech recognition decreases below a certain level.

In the exemplary embodiment described above, the recognition dictionary and language models are updated by using HTML, CHIJOUHA/DEJITARU of the analyzed text corresponding to the correct character string. In addition to this, the recognition dictionary and language models may also be updated by using the virtual text data resulted from speech recognition that corresponds to the recognition error.

Take the case shown in FIG. 5 as an exemplary embodiment. The language model may be modified so that, for the entry HTML, EIICHI/TEIMEI, the update processing section 103 increases the priority of the word HTML in the language model, decreases the priority of EIICHI and TEIMEI, and further decreases the priority of the sequence of the words EIICHI and TEIMEI.

In the process of updating the speech recognition dictionary, words having a priority lower than a predetermined threshold may be removed from the speech recognition dictionary.

To change these priorities, the amount of changing may be controlled in accordance to the frequency of occurrence. Specifically, priority of a word or a word string may be changed by a greater amount for an entry having a high frequency of occurrence and priority may be changed by only a small amount for an entry having a low frequency of occurrence Moreover, it is preferable to employ such a formulation that has an interface for notifying the content of updating the dictionary and language models to the system operator and an interface for inquiring the system operator whether to allow the updating or not, so as to avoid inappropriate alteration when updating the dictionary and language Also it is preferable that the virtual recognition error case data includes a part of speech which corresponds to each word. This makes it possible to decide whether the recognition dictionary and language models are to be changed or not by making reference to the information on the part of speech. For example, only such entries that include substance words such as noun or the stem of a verb that is considered important in updating the dictionary and language models are used in altering the dictionary and language models.

In the above description, the language model is modified by changing the priority of a word or a sequence of words. The priority may be interpreted as the priority in the known N-gram language model. For example, priority in the unigram (N=1) language model is the priority that an individual word appears when the sequence of words is ignored, denoted in a formulation as Pr(HTML). Priority in the bigram (N=2) is the conditional priority that a word appears when another word that immediately precedes is taken into account as history, denoted as Pr(DEJITARU|CHIJOUHA) or Pr(TEIMEI|EIICHI). Similarly, priority in the trigram (N=3) is the conditional priority that a word appears when two words that immediately precede are taken into account as history.

The virtual speech recognition processing section 102 shown in FIG. 3 may be modified into a simpler formulation. For example, such a formulation may be employed as the state/feature string converting section 63 is removed and the phoneme/state string converting section 62 is connected directly to the optimum word string searching section 64.

In this case, the optimum word string searching section 64 computes the similarity (measure) or distance, relative to all states in the acoustic model, of each element in the state string of HMM that has been received from the phoneme/state string converting section 62, and the optimum word string is determined in accordance to the linguistic constraint imposed by the recognition dictionary and language models. Distance between the states may be computed by using the measure of distance between probability distributions relating to the states, for example, using the Kullback-Leibler divergence. It is an efficient way to compute the distances between all states in the acoustic model in advance and store the results in the form of table in the acoustic model storage section 107.

In order to increase the processing speed, the range of search such as the frame-synchronized beam search mentioned previously may be limited (pruned). In the form of the virtual speech recognition processing section 102 illustrated in FIG. 3 as an example, the frame-synchronized beam search is constituted on the basis of the computation of the distance between feature vector and state. In this form where the state/feature string converting section 63 is omitted, in contrast, it is different in that the search is formulated on the basis of the computation of the distance between states, although the principle is almost the same.

The virtual speech recognition processing section 102 shown in FIG. 3 may also be modified into further simpler formulation. For example, such a formulation may be employed as the phoneme/state string converting section 62 and the state/feature string converting section 63 are removed and the pronunciation/phoneme string converting section 61 is connected directly to the optimum word string searching section 64.

In this case, the optimum word string searching section 64 computes the similarity (measure) or distance, relative to all phonemes in the acoustic model, of each element in the phoneme string that has been received from the pronunciation/phoneme string converting section 61, and the optimum word string is determined in accordance to the linguistic constraint imposed by the recognition dictionary and language models. The distance between phonemes may be computed as the sum of distances between the corresponding states, or the like.

While exemplary embodiments of the present invention have been described, the scope of the present invention is not limited to the exemplary embodiments described above, and various modifications may be made in accordance to the subject language of the speech recognition and the situation where the speech recognition system is to be used.

The invention claimed is:

1. A speech recognition dictionary compilation assisting system, comprising:
   a computer processing apparatus; and
   a computer-readable storage medium having data stored thereon that includes a dictionary, a language model, an acoustic model, and a speech recognition dictionary compilation assisting program that is executable by the computer processing apparatus to cause the computer processing apparatus to operate as:
   a text analysis section that applies morphological analysis to input text data to produce analyzed text data comprising words of the input text data and pronunciation information for each word;
   a virtual speech recognition processing section that performs a speech recognition process on said analyzed text data received from the text analysis section by applying the dictionary and the language model to said analyzed text data thereby to generate virtual text data, and that compares a pronunciation information of the virtual text data with the pronunciation information of the analyzed text data to extract and output different points of the analyzed text data and the virtual text data, each different point comprising an element of the analyzed text data and a corresponding element of the virtual text data; and an update processing section that corrects at least one of the dictionary and the language model in accordance with the different points identified by the virtual speech recognition processing section, wherein for each different point, the pronunciation information corresponding to a word of the analyzed text data differs from a corresponding pronunciation information of the virtual text data.

2. The speech recognition dictionary compilation assisting system according to claim 1, wherein said virtual speech recognition processing section generates a sequence of feature vectors from the analyzed text data, the sequence of feature vectors comprising acoustic parameters as elements, and performs a virtual speech recognition process on the sequence of feature vectors to generate the virtual text data.

3. The speech recognition dictionary compilation assisting system according to claim 1, wherein said storage medium stores a table of distances or degrees of resemblance between recognition units, and wherein said virtual speech recognition processing section generates a sequence of the recognition units from the analyzed text data, and searches in the dictionary and the language model for a string of words that has the least sum of distances or largest sum of the degrees of resemblance to generate the virtual text data.

4. The speech recognition dictionary compilation assisting system according to claim 1, wherein said storage medium stores a table of distances or degrees of resemblance between elements that constitute a recognition unit, and wherein said virtual speech recognition processing section generates a sequence of the elements from the analyzed text data, and searches in the dictionary and the language model for a string of words that has the least sum of distances or largest sum of the degrees of resemblance to generate the virtual text data.

5. The speech recognition dictionary compilation assisting system according to claim 1, wherein said update processing section adds a word that has appeared in the analyzed text data to the dictionary in accordance to the different points of the analyzed text data and the virtual text data.

6. The speech recognition dictionary compilation assisting system according to claim 1, wherein said update processing section corrects the language model such that a priority of a word or word string that has appeared in the analyzed text data becomes higher in accordance to the different points of the analyzed text data and the virtual text data.

7. The speech recognition dictionary compilation assisting system according to claim 6, wherein the update processing section controls an amount of changing of the priority in accordance to a frequency of appearance of the word or word string in the analyzed text data and the virtual text data.

8. The speech recognition dictionary compilation assisting system according to claim 1, wherein said update processing section corrects the language model such that a priority of a word or word string that has appeared in the virtual text data resulted from speech recognition becomes lower in accordance to the different points between the analyzed text data and the virtual text data.

9. A speech recognition dictionary compilation assisting method that uses a computer, comprising:

a text analysis step of, by the computer, applying morphological analysis to input text data to produce analyzed text data comprising words of the input text data and pronunciation information for each word;

a step of, by the computer, generating virtual text data from speech recognition from the analyzed text data output from the text analysis step by using a dictionary, a language model, and acoustic models stored in storage devices connected to the computer;

a step of, by the computer, comparing the pronunciation information of the analyzed text data with a pronunciation information of the virtual text data so as to extract and output different points therebetween, each different point comprising an element of the analyzed text data and a corresponding element of the virtual text data; and an updating process of, by the computer, correcting at least one of the dictionary and the language model in accordance with the different points, wherein for each different point, the pronunciation information corresponding to a word of the analyzed text data differs from a corresponding pronunciation information of the virtual text data.

10. The speech recognition dictionary compilation assisting method according to claim 9, wherein the computer generates a sequence of feature vectors from the analyzed text data, the sequence of feature vectors comprising acoustic parameters as elements, and virtually performs speech recognition so as to generate the virtual text data.

11. The speech recognition dictionary compilation assisting method according to claim 9, wherein the computer generates a sequence of the recognition units from the analyzed text data in accordance to a table of distances or degrees of resemblance between recognition units, and searches in the dictionary and the language model for a string of words that has the least sum of distances or largest sum of the degrees of resemblance to generate the virtual text data.

12. The speech recognition dictionary compilation assisting method according to claim 9, wherein the computer generates a sequence of the elements from the analyzed text data in accordance to a table of distances or degrees of resemblance between elements that constitute the recognition unit, and searches in the dictionary and the language model for a string of words that has the least sum of distances or largest sum of the degrees of resemblance to generate the virtual text data.

13. The speech recognition dictionary compilation assisting method according to claim 9, wherein the computer adds a word that has appeared in the analyzed text data to the dictionary in accordance to the different points of the analyzed text data and the virtual text data.

14. The speech recognition dictionary compilation assisting method according to claim 9, wherein the computer corrects the language model such that a priority of a word or word string that has appeared in the analyzed text data becomes higher in accordance to the different points between the analyzed text data and the virtual text data.

15. The speech recognition dictionary compilation assisting method according to claim 14, wherein the computer controls an amount of changing of the priority in accordance to a frequency of occurrence of the word or word string in the analyzed text data and the virtual text data.

16. The speech recognition dictionary compilation assisting method according to claim 9, wherein the computer corrects the language model such that a priority of a word or word string that has appeared in the virtual text data resulted from speech recognition becomes lower in accordance to the different points between the analyzed text data and the virtual text data.

17. A program stored on a non-transitory computer-readable storage medium and executable on a computer to cause the computer to operate as a speech recognition dictionary compilation assisting system that performs the following:

a text analysis process that applies morphological analysis to input text data to produce analyzed text data comprising words of the input text data and pronunciation information for each word;

a process that generates virtual text data from speech recognition from the analyzed text data output from the text analysis process by using a dictionary, a language model and acoustic models stored in non-transitory computer-readable storage devices;

a virtual speech recognition process that compares the pronunciation information of the analyzed text data with a pronunciation information of the virtual text data so as to extract and output different points therebetween, each different point comprising an element of the analyzed text data and a corresponding element of the virtual text data; and an updating process that corrects at least one of the dictionary and the language model in accordance with the different points, wherein for each different point, the pronunciation information corresponding to a word of the analyzed text data differs from a corresponding pronunciation information of the virtual text data.

18. The program according to claim 17 that causes the computer to generate a sequence of feature vectors from the analyzed text data, the sequence of feature vectors comprising acoustic parameters as elements, and to virtually perform speech recognition so as to generate the virtual text data.

19. The program according to claim 17 that causes the computer to generate a sequence of the recognition units from the analyzed text data in accordance to a table of distances or degrees of resemblance between recognition units, and to search in the dictionary and the language model for a string of words that has the least sum of distances or largest sum of the degrees of resemblance to generate the virtual text data.

20. The program according to claim 17 that causes the computer to generate a sequence of the elements from the analyzed text data in accordance to a table of distances or degrees of resemblance between elements that constitute a recognition unit, and to search in the dictionary and the language model for a string of words that has the least sum of distances or largest sum of the degrees of resemblance to generate the virtual text data.

21. The program according to claim 17 that causes the computer to add a word that has appeared in the analyzed text data to the dictionary in accordance to the different points of the analyzed text data and the virtual text data resulted from speech.

22. The program according to claim 17 that causes the computer to correct the language model such that a priority of a word or word string that has appeared in the analyzed text data becomes higher in accordance to the different points between the analyzed text data and the virtual text data in the updating process.

23. The program according to claim 22 that causes the computer to control an amount of changing of the priority in accordance to a frequency of occurrence of the word or word string in the analyzed text data and the virtual text data in the updating process.

24. The program according to claim 17 that causes the computer to correct the language model such that a priority of a word or word string that has appeared in the virtual text data resulted from speech recognition becomes lower in accordance to the different points between the analyzed text data and the virtual text data in the updating process.

* * * * *

UNITED STATES PATENT AND TRADEMARK OFFICE
CERTIFICATE OF CORRECTION

PATENT NO. : 8,719,021 B2
APPLICATION NO. : 12/280594
DATED : May 6, 2014
INVENTOR(S) : Takafumi Koshinaka Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1530 days.

Signed and Sealed this

Twenty-ninth Day of September, 2015

Michelle K. Lee
*Director of the United States Patent and Trademark Office*